United States Patent [19]

Larkin

[11] Patent Number: 5,687,213
[45] Date of Patent: Nov. 11, 1997

[54] TELEPHONE LINE TESTING DEVICE

[75] Inventor: Kevin B. Larkin, Scotts Valley, Calif.

[73] Assignee: Westek Electronics, Inc., Scotts Valley, Calif.

[21] Appl. No.: 380,675

[22] Filed: Jan. 30, 1995

[51] Int. Cl.[6] .................. H04M 1/24; H01R 23/02
[52] U.S. Cl. .................. 379/21; 379/27; 379/438; 439/676
[58] Field of Search .................. 379/1, 21, 27, 379/29, 438, 442; 439/626, 638, 650, 655, 666, 668, 676

[56] References Cited

U.S. PATENT DOCUMENTS

| 4,002,861 | 1/1977 | Putt | 379/21 |
|---|---|---|---|
| 4,209,671 | 6/1980 | Charles et al. | 379/21 |
| 4,214,132 | 7/1980 | Kelso | 379/21 |
| 4,292,480 | 9/1981 | Sweatt | 379/21 |
| 4,564,728 | 1/1986 | Romano | 379/27 |
| 5,440,609 | 8/1995 | Curtis | 379/21 |

OTHER PUBLICATIONS

Allied Catalog (telephone connectors), 1986.
Westek Electronics, Inc., "Central Office Test Cords advertisement (at least as early as 1994), showing W112 SLC-96 Channel Cord, W463EF Trouble Locator Test Cord and W2EF 300 Series".
Harris Dracon Division, *Tools, Test Sets, and Wiring Devices* catalog, Harris Corporation Form No. 3084, 20M Sep. 1993, p. 17.

*Primary Examiner*—Curtis Kuntz
*Assistant Examiner*—Paul Loomis
*Attorney, Agent, or Firm*—Limbach & Limbach L.L.P.

[57] ABSTRACT

A telephone line tester includes a pin socket connector, a modular jack connector and a plurality of lines out. The telephone line tester can be connected to a telephone line at a modular jack interface, and alternatively, at a pin socket interface. Testing can be performed by accessing signals of the telephone line through the plurality of lines out. Testing can also be performed by accessing signals of the telephone line through the modular jack connector.

11 Claims, 5 Drawing Sheets

TELEPHONE LINE TESTING DEVICE

BACKGROUND OF THE INVENTION

1. Field of the Invention

The invention relates to devices which allow discrete access to the various signals included in a telephone line. More particularly, the invention relates to devices for testing telephone lines at connector blocks and devices for testing telephone lines at modular jack interfaces. These devices for testing telephone lines allow for troubleshooting or fault locating on a telephone line.

2. Background Art

Figure 7:
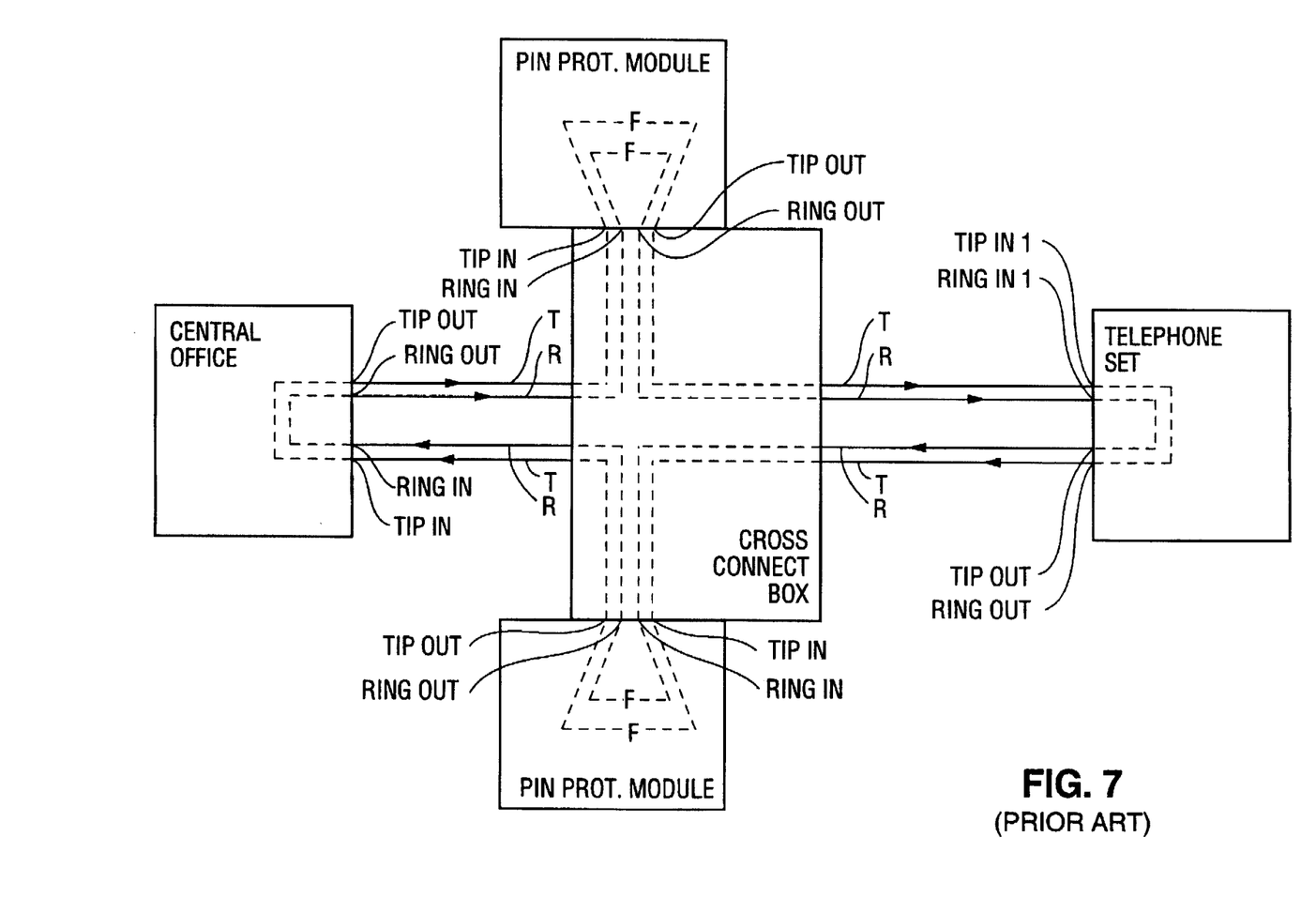
FIG. 7 is a circuit diagram showing a conventional telephone communication circuit.

A conventional telephone communication circuit will be described with reference to FIG. 7. FIG. 7 shows a circuit made by a telephone line which runs from a central office, through a cross connect box, to a telephone set, back through the cross connect box, and back to the central office.

A telephone line is generally made up of a pair of discrete wires which carry signals along the telephone line. The wires of each pair are called "tip" T and "ring" R respectively, as shown in FIG. 7. The direction of the signals is indicated by arrows on the tip T and ring R wires shown in FIG. 7.

A telephone interface occurs where the telephone line runs into and back out of some object, such as the central office or the telephone set as shown in FIG. 7. Because the pair of tip T and ring R wires runs both into the object and out of the object at the interface, there are four wire interfaces at a telephone interface. Specifically, these are:

1. A tip in wire interface (hereinafter called "tip in") where the tip wire T runs into the object, 2. A ring in wire interface (hereinafter "ring in") where the ring wire R runs into the object, 3. A tip out wire interface (hereinafter "tip out") where the tip wire T runs out of the object, and 4. A ring out wire interface (hereinafter "ring out") where the ring wire R runs out of the object.

These wire interface are labelled in FIG. 7 at the telephone interface at the central office and at the telephone interface at the telephone set. The tip in and ring in wire interfaces are sometimes called a receive pair. The tip out and ring out pair are sometimes called the transmit pair.

In the vicinity of a telephone interface, the four wires are often placed in insulative sheathing which is color coded according to a common convention:

Green = Tip In
Red = Ring In
Black = Tip Out
Yellow = Ring Out.

At a telephone interface, the four wire interfaces are usually detachably connectable at the interface. This detachable connection is conventionally made through either a modular jack interface or a pin socket interface. Modular jack interfaces include a male modular jack connector at one termination of a telephone line connected to a female modular jack connector at the other termination of the telephone line. One common application of modular jack interfaces occurs where a telephone line is attached to a telephone set.

Pin socket interfaces include two mateable pin socket connectors (sometimes called prong modules). The pin socket connectors each have protruding, conductive pins (sometimes called prongs) and/or sockets which are designed to receive and hold these pins. Pin socket connectors having only pins are called pin connectors herein. Pin socket connectors having only sockets are called socket connectors herein. Pin socket connectors having both pins and sockets are called hybrid pin socket connectors herein. Telephone wire terminations are interfaced through the contact between a mating pin and socket. Often, pin socket connectors will additionally include a grounding pin (or socket), which can be connected to an electrical ground. One common application of pin socket interfaces occurs at connector blocks.

Connector blocks are generally found in cross-connect boxes and at locations where a multitude of phone lines run into and/or out of a building. At connector blocks, a multitude (generally between 25 and 100) of telephone lines each run respectively through a detachable fuse. These detachable fuses are called pin protection modules. Two such detachable pin protection modules are connected to the cross connect box shown in FIG. 7. When the pin protection module is in place it will protect the telephone line from damage due to abnormal signals such as sneak current or high voltage signals by means of a fuse F placed respectively in the tip and ring wires.

The telephone line runs into and out of the pin protection module, thus forming a four wire telephone interface as described above. Tip in, ring in, tip out and ring out are labelled for the telephone interfaces for each pin protection module shown in FIG. 7. Telephone interfaces at the pin protection modules are generally formed as pin socket interfaces as described above. Conventionally a pin connector on the pin protection module will be connected to a socket connector in the cross connect box. A pair of telephone wires usually requires a 5 pin protection modules (i.e., two pins for the tip and ring wires to run into the pin protection module, two pins for the tip and ring wires to run out of the pin protection module, plus a ground pin).

Telephone lines utilizing the above described types of interfacing sometimes break down. For instance, there may be a physical break in the telephone line. In this case, it is useful to have direct access to the discrete wires of the telephone line to assist in isolating and precisely locating the problem. For instance, it can be helpful to access the telephone line as close as is feasible to the break down. Access to the wires is provided through telephone line testers. These devices are designed to be connected at a telephone interface. Telephone line testers have contacts which can provide access to the signal of each wire interface (e.g., tip in, ring in, tip out and ring out).

One type of telephone line tester is the in-line modular adapter. These telephone line testers have a modular jack connector at each end. These modular jack connectors are designed to be connected to two ends of a telephone line which terminate in modular jack connectors. It is often desirable to test a telephone line at a modular jack interface because the modular jack interface allows for easy access to the line. Testing at modular jack interface locations can be especially useful in isolating problems which occur in the vicinity of a pre-existing modular jack interface, such as a telephone set malfunction. The contacts, corresponding to tip in, ring in, tip out and ring out, are formed as clip compatible ears formed in the in-line modular adapter. These clip compatible ears receive alligator clips for transmitting the signals of each wire the four wire interfaces to testing equipment.

Another type of telephone line tester is designed for testing telephone wires at a pin socket interface. This type of telephone line tester facilitates testing at connector blocks.

Connector blocks are considered a good location for testing telephone lines for several reasons including the following: (1) the pin socket interfaces at connector blocks allow access to the line without cutting wires or insulation, (2) connector blocks are a good place to help locate line breaks because connector blocks often occur at intermediate locations along a telephone line, and (3) a multitude of telephone lines come into close proximity at a connector block.

In order to test a telephone wire at a connector block, the pin protection module associated with the telephone line is pulled from the pin socket connector in the body of the connector block. A telephone line tester designed for testing at a pin socket interface is plugged into the pin socket connector in the body of the connector block. Once the line tester is plugged in, a telephone wire, either tip in/out or ring in/out, can be accessed through contacts extending from the telephone line tester in the form of alligator clips.

Although the telephone line tester for testing at cross connect boxes have a sufficient number of pins or sockets (typically 4 or 5) to mechanically interface at the cross connect box, this telephone line tester only has two active pins or sockets which correspond to the two alligator clips extending from the tester. This means that only two signals can be accessed by this tester. This tester may be designed to access tip in/out, or, alternatively, ring in/out. This tester does not allow simultaneous access of the four wire interfaces.

Telephone line testers which can be used at pin socket interfaces (such as connector blocks) cannot be used at modular jack interfaces. Therefore, two different telephone line testing devices must be used in order to test lines at both pin socket interfaces and modular jack interfaces. This makes telephone line tester tooling bulky and expensive. In fact, it is thought that some telephone technicians do not have both types of telephone line testers. These telephone line technicians would need to resort other, more difficult methods of accessing telephone lines, such as access by cutting insulation away from the telephone line and connecting directly to the exposed wires in order to gain access to the wires of the telephone line in proximity to a suspected breakdown.

Also, when testing a telephone line at a pin socket interface, any peripheral test equipment must be compatible with the alligator clip contacts of this type of telephone line tester. This means that test equipment which is designed to be connected via a modular jack interface cannot be used at a pin socket interface location (such as a connector block).

SUMMARY OF THE INVENTION

The present invention is designed to allow access to telephone signals and access to telephone line transmissions utilizing a single telephone line tester. Furthermore, the telephone line tester of the present invention is quick and easy to use. It is compatible with more types of telephone line interfacing, and therefore useful in more types of testing environments, than conventional telephone line testers.

In other words, the telephone line tester according to the present invention achieves multiple functions as a single tool. In a typical situation, when testing is required on a telephone line, a conventional telephone line tester is limited to one form of access to the line (i.e., modular jack interface access or pin socket interface, access). The present invention offers multiple types of access and testing with a single piece of equipment.

It is an object of the present invention to provide a telephone line tester which can be used to test telephone lines at both pin socket interfaces and modular jack interfaces. It is also an object of the present invention to provide a telephone line tester which is less bulky and less expensive than existing telephone line testers. Furthermore, it is an object of the present invention to provide a telephone line tester which can be used at a pin socket interface in conjunction with test equipment which requires a modular jack interface. The telephone line tester according can effectively replace two separate pieces of test equipment with attendant cost savings as well as substantial reduction in time required to perform test procedures relative to the time required with conventional line testers.

In accordance with the present invention, a telephone line tester includes a pin socket connector, formed as a plurality of pin and/or socket contacts, which can be plugged into a pin socket connector in a telephone line. The telephone line tester also includes lines out, formed as, for example, clip compatible ears which are respectively connected to the contacts comprising the pin socket connector.

The telephone line tester also includes a modular jack interface which is connected to the pin socket connector. A modular jack interface includes a plurality of contacts which are configured to provide for modular jack interfacing with a telephone line, with each contact of the modular jack connector respectively connected to a contact of the pin socket connector. The modular jack interface may be formed as a female modular jack connector (such as a female RJ-11 modular jack connector) and a detachable male modular jack adapter. This allows the modular jack interface of the telephone line tester to be connected to telephone lines (or test equipment) terminating in either male or female modular jack connectors.

According to another aspect of the present invention, the telephone line tester is provided with a cap which can be connected to the pin socket connector of the telephone line tester. The cap also includes a modular jack connector, so that telephone line tester can connect two ends of a telephone line which terminate in modular jack connectors when desired.

A better understanding of the features and advantages of the present invention will be obtained by reference to the following detailed description and accompanying drawings which set forth illustrative embodiments in which principles of the present invention are utilized.

DETAILED DESCRIPTION OF THE INVENTION

Figure 1:
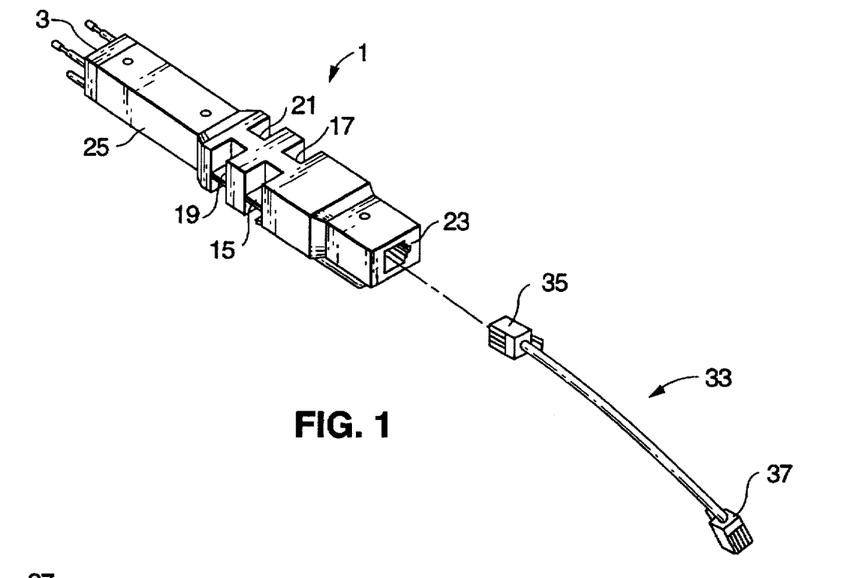
FIG. 1 is a perspective view of an embodiment according to the present invention.
Figure 2:
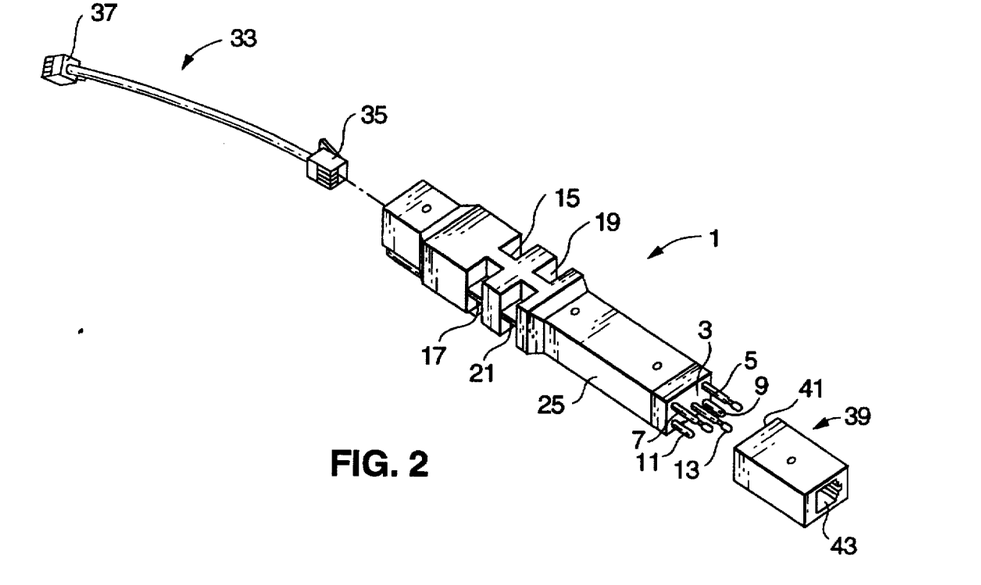
FIG. 2 is another perspective view of another embodiment according to the present invention which includes the embodiment shown in FIG. 1 and a cap.

Referring to FIGS. 1 and 2, an embodiment of a telephone line tester 1 will be described. The telephone line tester 1 has an elongated housing 25. This housing 25 is preferably comprised of a durable and non-conductive material such as polycarbonate material.

A pin connector 3 is disposed at one end of the housing 25. This pin connector 3 includes protruding, conductive pins 5, 7, 9, 11 and 13. These pins are preferably positioned and shaped to allow interfacing with standard socket connectors (not shown), such as those on telephone connector blocks (not shown). In a preferred embodiment, the pins 5, 7, 9 and 11 are used to contact telephone wires as follows:

1. One pin contacts a "tip in" wire carries signals at the socket connector in a first direction.
2. One pin contacts a "tip out" wire at the socket connector in a direction opposite the first direction (Note that the connection of the "tip in" wire to the "tip out" wire is normally maintained via the pin protection module).
3. One pin contacts a "ring in" wire which carries signals at the socket connector in the first direction.
4. One pin contacts a "ring out" wire which carries signals at the socket connector in the direction opposite the first direction (Note that the connection of the "ring in" wire to the "ring out" wire is normally maintained via the pin protection module).

The pin 13 can be used as a ground pin, and may be connected to an electrical ground (not shown). It should be noted that the pin connector 3 may alternatively be formed as a hybrid pin socket connector or as a socket connector in some embodiments of the present invention depending upon the desired applications of the telephone line tester.

Clip compatible ears 15, 17, 19 and 21 are formed in the housing 25. These clip compatible ears 15, 17, 19 and 21 are respectively formed as a flat, conductive tab within a recess in the housing 25. Clips, such as alligator clips, (not shown) can be clipped onto the clip compatible ears 15, 17, 19 and 21 so that electrical signals may be transmitted through the clip compatible ears 15, 17, 19 and 21 to any attached clips.

A female modular jack connector 23 is formed at the end of the housing 25 opposite the pin connector 3. This modular jack connector may be formed as a standard RJ-11 female modular jack connector to provide interfacing with lines utilizing this prevalent standard. This female modular jack connector 23 is detachably mateable with a male modular jack adapter 33. The male modular jack adapter includes two connected male modular jack connectors 35 and 37. When the male modular jack adapter 33 is mated with the female modular jack connector 23 through the male modular jack connector 35, the telephone line tester 1 can be connected to a telephone line (not shown), or test equipment (not shown), which terminates in a female modular jack connector. When the male modular jack adapter 33 is not in place, then the telephone line tester 1 can be mated with a telephone line (not shown), or test equipment (not shown), terminating in a male modular jack connector.

The embodiment shown in FIG. 2 also includes a cap 39. This cap 39 has a socket connector 41 disposed on one end which is detachably mateable to the pin connector 3. It should be noted that in some embodiments of the present invention, the socket connector of the cap will alternatively be formed as a hybrid pin socket connector or as a pin connector in order to be mateable with the pin socket connector on the body of the telephone line tester. The cap has a female modular jack connector 43 at the opposite end. When the cap 39 is mated with the pin connector 3, then the pin connector end of the telephone line tester 1 can be connected at either end to two ends of a telephone line (not shown) which terminate in modular jack connectors. Male modular adapters 33 can be used to facilitate this connection when the telephone line has a female modular jack connector termination.

Figure 3:
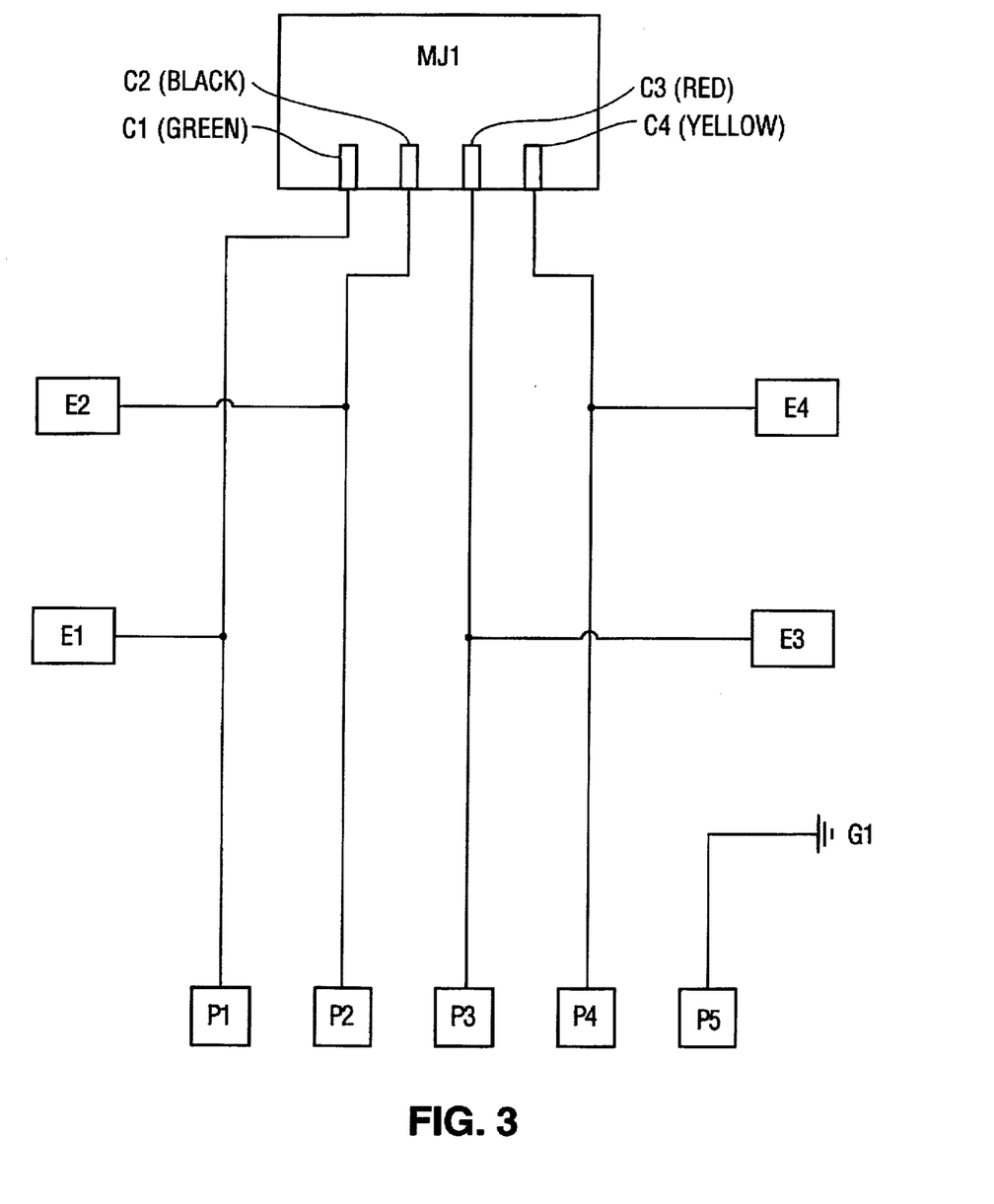
FIG. 3 is a circuit diagram of an embodiment according to the present invention.

Referring now to FIG. 3, the wiring within an embodiment of a telephone line tester according to the present invention, which can be used to provide access to telephone wires, will be described. The pin connector has 5 pins P1, P2, P3, P4 and P5.

Pin P1 is electrically connected to a clip compatible ear E1 and to the modular jack connector MJ1 at wire interface C1. This connection allows a "tip in" signal to be transmitted between the pin connector and the modular jack connector MJ1. The "tip in" signal is also supplied to the clip compatible ear E1 so that this signal can be accessed by testing equipment (not shown).

Pin P2 is electrically connected to a clip compatible ear E2 and to the modular jack connector MJ1 at wire interface C2. This connection allows a "tip out" signal to be transmitted between the pin connector and the modular jack connector MJ1. The "tip out" signal is also supplied to the clip compatible ear E2 so that this signal can be accessed by testing equipment (not shown).

Pin P3 is electrically connected to a clip compatible ear E3 and to the modular jack connector MJ1 at wire interface C3. This connection allows a "ring in" signal to be transmitted between the pin connector and the modular jack connector MJ1. The "ring in" signal is also supplied to the clip compatible ear E3 so that this signal can be accessed by testing equipment (not shown).

Pin P4 is electrically connected to a clip compatible ear E4 and to the modular jack connector MJ1 at wire interface C4. This connection allows a "ring out" signal to be transmitted between the pin connector and the modular jack connector MJ1. The "ring out" signal is also supplied to the clip compatible ear E4 so that this signal can be accessed by testing equipment (not shown).

As shown in FIG. 3, pin P5 is electrically connected to an electrical ground G1. If the modular jack connector is color coded according to common convention, then the pins P1, P2, P3 and P4 are respectively connected to green C1, black C2, red C3 and yellow C4 terminals of the modular jack connector MJ1 as shown in FIG. 3.

Figure 4:
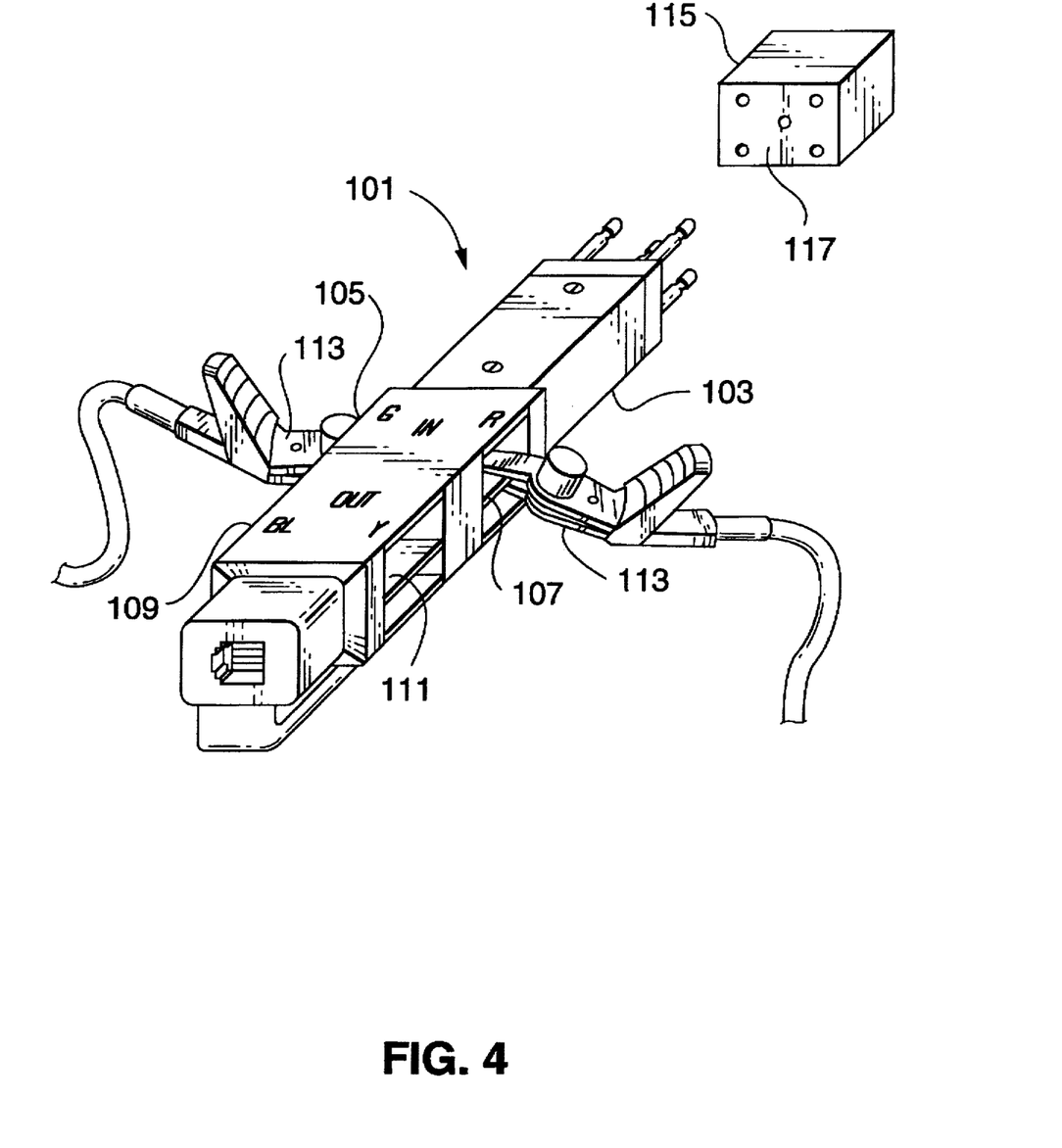
FIG. 4 is a perspective view of another embodiment according to the present invention.

A preferred embodiment of the present invention is shown in FIG. 4. In this preferred embodiment, the clip compatible ears 105 and 107 corresponding respectively to the "tip in" and "ring in" signals are formed in a pair opposite each other across the housing 103 of the telephone line tester 101. Likewise, in this preferred embodiment, the clip compatible ears 109 and 111 corresponding respectively to the "tip out" and "ring out" signals are formed in a pair opposite each other across the housing 103 of the telephone line tester 101. As FIG. 4 shows, it is helpful to label the clip compatible ears so that telephone line testing personnel will quickly be able to determine which clip compatible ear is connected to each signal.

FIG. 4 shows the connection between alligator clips 113 of test equipment (not shown) and the clip compatible ears 105 and 107. FIG. 4 also shows an alternative design for the recess in the housing 103 around the clip compatible ears 107 and 111.

FIG. 4 also provides a view which clearly shows the mating between a cap 115 (similar to cap 39 in FIG. 2) and a telephone line tester 103 through a socket connector 117 disposed on the cap 115.

Figure 5:
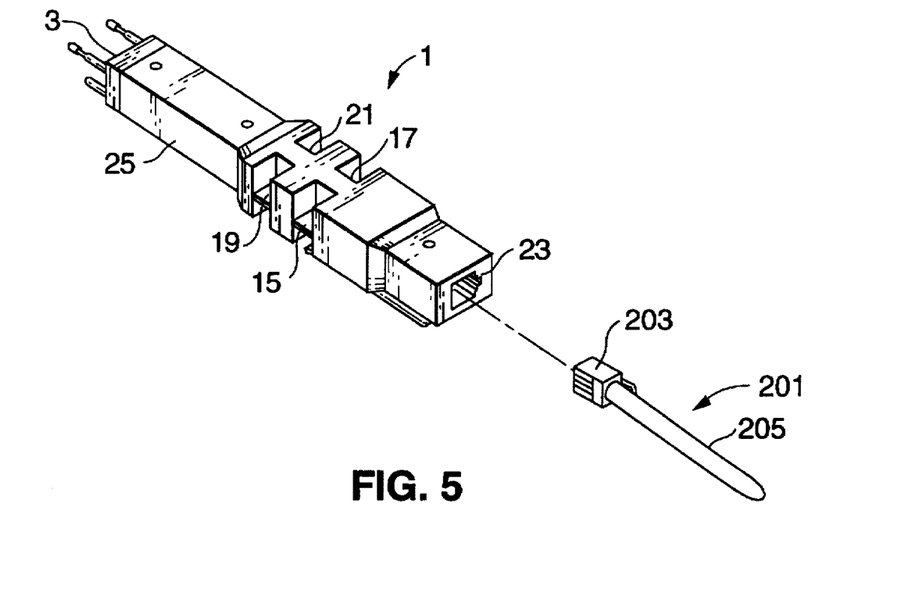
FIG. 5 is perspective view which shows a looping plug.

FIG. 5 shows another embodiment of a telephone line tester according to the present invention. This embodiment further includes a looping plug 201. The looping plug is detachably connectable to the female modular jack connector 23 in the housing 25. The looping plug 201 includes a male modular jack connector 203 and a looping plug body 205. The looping plug body 205 includes insulative sheathing place over circuitry which will be described below with reference to FIG. 6.

Figure 6:
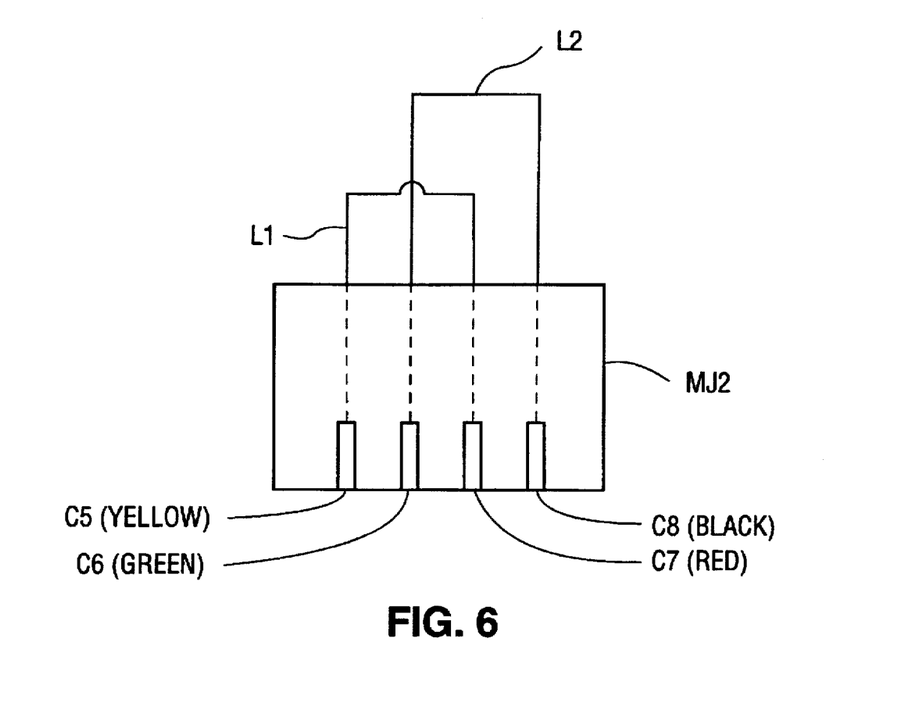
FIG. 6 is a circuit diagram of the looping plug.

In FIG. 6, the modular jack interface of the looping plug is shown by MJ2. The ring out terminal C5 of the modular jack interface is electrically connected, or looped, with the ring in terminal C7. The tip in terminal C6 is electrically connected, or looped with the tip out terminal C8. Illustrative uses of the looping plug will be described below.

Illustrative examples of two methods of using an embodiment of a telephone line tester will now be given with reference to the embodiments shown in FIGS. 1 and 2.

(1) Testing at a Connector Block

A connector block includes a multitude of standard socket connectors. Each of the socket connectors has sockets for receiving 5 pins. A 5 pin protection module is plugged into each of the socket connectors of the connector block. The telephone wires to be tested are selected. The pin protection module corresponding to these telephone wires is disconnected from the connector block. The telephone line tester 1 is then plugged into the socket connector of the connector block through the pin connector 3.

If the test equipment for testing the telephone line utilizes alligator clips for receiving signals, then these clips are attached to the clip compatible ears 15, 17, 19 and 21 to access the "tip in", "tip out", "ring in" and "ring out" signals associated with the telephone wires. The clips feed the signal to various telephone line testing equipment which can isolate and precisely locate possible problems in the telephone line.

Because four pins in the telephone line tester are connected with four clip compatible ears 15, 17, 19 and 21, this means that all four signals can be simultaneously accessed. This is an improvement over the conventional device wherein only two pins were active, and only two signals could be simultaneously accessed.

When the telephone line tester is connected at a connector block, the looping plug 201 described above may be used. The male modular jack connector 203 of the looping plug 201 is connected to the female modular jack connector 23 as shown in FIG. 5. With the looping plug 201 in place, there will be an electrical connection between the "tip in" pin and the "tip out" pin. There will also be an electrical connection between the "ring in" pin and the "ring out" pin.

These connections result in the fact that the four signals cannot be separately tested. However, these connections will place the telephone line in service. Therefore, the looping plug can be used whenever there is a break period in testing. At the start of the break period, the looping plug 201 is put into place to restore telephone service. When testing is resumed at the end of the break period, the looping plug 201 is removed to allow separate testing of the four signals.

The looping plug 201 can also be used when the voltage drop on the tip wire or the ring wire is to be tested. When the looping plug 201 is in place, the voltage drop across the tip or ring wire can be tested by accessing the clip compatible ears 15, 17, 19 and 21.

If the test equipment for testing the telephone line utilizes a male modular jack connector for receiving signals, then this male modular jack connector is inserted into the female modular jack connector 23 in the body of the telephone line tester 1. This modular jack interface will provide the testing equipment with the "tip in", "tip out", "ring in", and "ring out" signals, as described in connection with FIG. 3.

If the test equipment for testing the telephone line utilizes a female modular jack connector for receiving signals, then the male modular jack adapter 33 is inserted into the female modular jack connector 23 in the body of the telephone line tester 1. The male modular jack adapter 33 is also inserted into the female modular jack connector in the testing equipment. This modular jack interfacing will provide the testing equipment with the "tip in", "tip out", "ring in", and "ring out" signals, as described in connection with FIG. 3.

When testing is complete, the telephone line tester is disconnected from the test equipment and the socket connector, and the pin protection module is re-inserted into the socket connector.

Testing telephone lines in this manner makes testing easy and insures against improper test procedures that can lead to false results or loosing of wire wrap.

(2) Testing at a Modular Jack Interface in a Telephone Line

In this example, the cap 39 is mated with the pin connector 3 of the telephone line tester 1. The telephone line is disconnected at the modular interface in the telephone line. Note that one end of this disconnected line will terminate in a male modular jack connector, and the other end of this telephone line will terminate in a female modular jack connector.

The end of the telephone line tester 1 with the cap 39 is connected to one end of the telephone line. If this end of the telephone line terminates in a male modular jack connector, then the end of the telephone line is plugged directly into the female modular jack connector 43 formed in the cap 39. If this end of the telephone line terminates in a female modular jack connector, then the male modular adapter 33 is used to connect the end of the telephone line to the female modular jack connector 43 in the cap.

The other end of the telephone line tester 1 is connected to the other end of the telephone line. If this end of the telephone line terminates in a male modular jack connector, then the end is plugged directly into the female modular jack connector 23 formed in body of the telephone line tester 1. If this end of the telephone line terminates in a female modular jack connector, then the male modular adapter 33 is used to connect the end of the telephone line to the female modular jack connector 23.

Once the telephone line tester 1 is connected in this way, the telephone line will be in service. The line is tested by accessing the clip compatible ears 15, 17, 19 and 21. When testing is completed, the telephone line tester 1 is disconnected from the ends of the telephone line, and the ends of the telephone line are reconnected to each other.

It is to be understood that the present invention is not limited to the above described embodiments, and that various changes and modifications could be effected by one skilled in the art without departing from the spirit or scope of the invention as defined in the appended claims.

What is claimed is:

1. A telephone line tester comprising:
   a pin socket connector comprising a plurality of contacts which are configured to provide for pin socket interfacing with a plurality of wires of a telephone line;
   a plurality of lines out, such that each line out is respectively connected to a contact of the pin socket connector; and
   a modular jack interface, comprising a plurality of contacts which are configured to provide for modular jack interfacing with a telephone line, with each contact of the modular jack connector respectively connected to a contact of the pin socket connector.

2. The telephone line tester of claim 1 further comprising:

an elongated housing so that the pin socket connector is disposed at one end of the housing, the modular jack interface is disposed at the other end of the housing, and the lines out are formed as clip compatible ears which are disposed along the elongated portion of the housing.

3. The telephone line tester of claim 2 wherein the housing is comprised of polycarbonate material.

4. The telephone line tester of claim 2 wherein the modular jack interface comprises:

a female modular jack connector formed in the housing; and a male modular jack adapter comprising two connected male modular jack connectors which are detachably mateable with the female modular jack connector.

5. The telephone line tester of claim 4 wherein the female modular jack connector comprises a female RJ-11 modular jack.

6. The telephone line tester of claim 2 wherein:

the pin socket connector is formed as a pin connector which comprises a tip in pin, a ring in, a tip out pin and a ring out pin;

the clip compatible ears comprise a first pair of clip compatible ears and a second pair of clip compatible ears, so that each pair of clip compatible ears is disposed symmetrically about the longitudinal axis of the housing;

the modular jack interface comprises a green line, a red line, a black line, and a yellow line;

the first pair of clip compatible ears are respectively connected to the tip in pin and ring in pin of the pin socket connector;

the second pair of clip compatible ears are respectively connected to the tip out pin and ring out pin of the pin socket connector; and the tip in, ring in, tip out and ring out pins are respectively connected to green, red, black and yellow lines of the modular jack interface.

7. The telephone line tester of claim 6 wherein the pin socket connector further comprises a ground pin.

8. A telephone line tester comprising:

a five pin connector comprising a tip in pin, tip out pin, ring in pin, ring out pin and ground pin which are configured to provide for pin socket interfacing with a five socket connector of a connector block;

a plurality of lines out, such that each line out is respectively connected to a contact of the pin socket connector; and a modular jack interface, comprising a plurality of contacts which are configured to provide for modular jack interfacing with a telephone line, with each contact of the modular jack connector respectively connected to a contact of the pin socket connector;

an elongated housing so that the pin socket connector is disposed at one end of the housing, the modular jack interface is disposed at the other end of the housing, and the lines out are formed as clip compatible ears which are disposed along the elongated portion of the housing; and a cap which is formed with a cap modular jack connector and a cap five socket connector, with the five sockets of the call socket connector being configured as the as the sockets of a socket connector of a connector block, and with the cap five socket connector being detachably mateable with the pin socket connector disposed on the housing.

9. The telephone line tester of claim 1 wherein the contacts of the pin socket connector are each connected to a contact of the modular jack connector by a wire, and the lines out are respectively connected to the wires between the pin socket connector and the modular jack connector.

10. A The telephone line tester according to claim 1, further comprising:

an elongated housing so that the pin socket connector is disposed at one end of the housing, the modular jack interface is disposed at the other end of the housing, and the lines out are formed as clip compatible ears which are disposed along the elongated portion of the housing; and a looping plug which is formed with a looping plug modular jack connector which is detachably connectable to the modular jack interface disposed on the housing, with the looping plug modular jack connector having at least one pair of contacts and at least one looping line respectively electrically connecting the contacts of each pair of contacts.

11. A method of testing a telephone line in the vicinity of a connector block having a socket connector for the telephone line with a fuse plugged into it, the method comprising the steps of:

providing a telephone line tester which includes:

a pin connector comprising a plurality of pins which are configured to be connected with the socket connector of the connector block;

a plurality of lines out, such that each line out is respectively connected to a pin of the pin connector; and a modular jack interface, comprising a plurality of contacts which are configured to provide for modular jack interfacing with a telephone line, with each contact of the modular jack connector respectively connected to a pin of the pin connector;

removing the fuse from the socket connector of the connector block;

plugging the pin connector of the telephone line tester into the socket connector of the connector block; and testing the telephone line using the lines out of the telephone line tester.

* * * * *